(No Model.)
F. H. BOLTE.
GREASE CUP.
No. 325,726.        Patented Sept. 8, 1885.
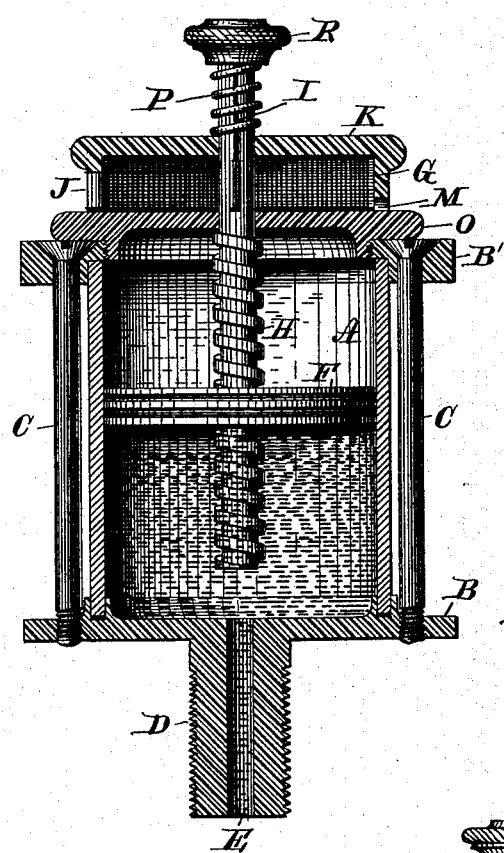
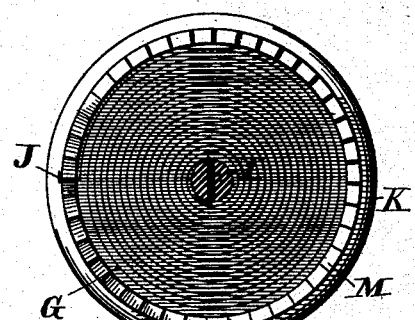
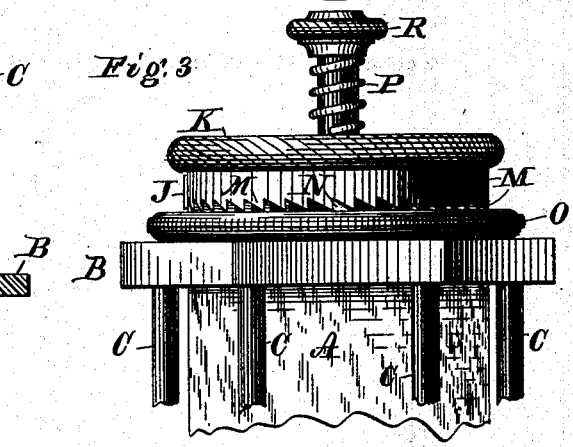
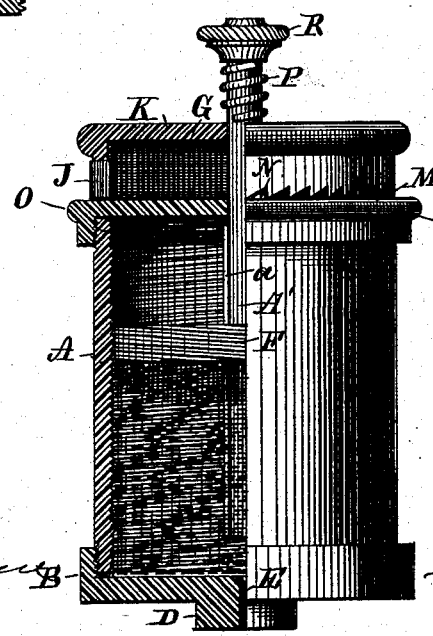
Witnesses
G. M. Gridley
Frank H. Bolte
Inventor
By Erwin Benedict
Attorneys

UNITED STATES PATENT OFFICE.

FRANK H. BOLTE, OF MILWAUKEE, WISCONSIN, ASSIGNOR TO H. J. DELANY AND R. C. GILJOHAN, OF SAME PLACE.

GREASE-CUP.

SPECIFICATION forming part of Letters Patent No. 325,726, dated September 8, 1885.

Application filed January 22, 1885. (No model.)

*To all whom it may concern:*

Be it known that I, FRANK H. BOLTE, a citizen of the United States, residing at Milwaukee, in the county of Milwaukee and State of Wisconsin, have invented certain new and useful Improvements in Grease-Cups; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in that class of lubricator-cups which are adapted to be used in lubricating machinery with grease or other heavy lubricant.

The object of my invention is to provide a device for automatically forcing the lubricant from the cup, without waste, slowly and uniformly, as the requirements of the machinery may demand.

The construction of my cup is explained by reference to the accompanying drawings, in which Figure 1 represents a vertical section. Fig. 2 is a bottom view of the upper cover. Fig. 3 is a side view; and Fig. 4 represents a modification of Fig. 1.

Like parts are represented by the same reference-letters throughout the several views.

The receptacle A of the cup is preferably made of glass, cylindrical in form, and having metallic heads B B', which are held in place against the respective ends of the glass cylinder A by screw-bolts C. D is the neck of the cup, by which it is attached to the part of the machine to be lubricated, and through the duct E of which the lubricant escapes. The lubricant is forced from the cup by the piston F, which piston is actuated by a coiled spring, G. The coiled spring G having been previously wound up, in recoiling turns the screw H. The screw in turning forces down the piston upon the lubricant. The inner end of the coiled spring G is attached to the screw H within the slot I, and its outer end is attached to the cover K within a slot at J. Thus it is obvious that the screw H being at rest, the spring G is wound up by turning the cover K, and that when the spring is thus wound and the cover K is at rest, the screw H will be turned in the same direction as the cover by the recoil or unwinding of the spring, whereby the piston is forced down upon the lubricant. The screw and inner end of the spring may be prevented from turning as the spring is wound by holding the protruding end of the screw. This, however, is seldom necessary, as the screw and piston are prevented from turning when winding the spring by contact of the piston with the lubricant and the side of the cup, while the friction of the screw in the piston prevents it from turning but slowly as the lubricant escapes.

To prevent the cover K from turning back with the recoil of the outer end of the spring as it is wound, it is provided at its lower edge with a ratchet, M, the teeth of which, as the cover is turned, engage in the catch or pawl N, formed on the upper surface of the stationary cover O. The cover O, when attached to a glass cup, as in Fig. 1, is screwed to the inner edge of the annular head B'; but when affixed to the metallic cup shown in Fig. 4 it is screwed to its periphery, as shown. In both forms of cup, when being filled, it becomes necessary to unscrew the cover O and withdraw it and the piston from the receptacle. The upper cover is loosely fitted to the protruding end of the screw, and it is retained in place thereon by the spiral spring P and knob R. The office of the spring P is to hold the cover down, so that the ratchet-teeth M will engage in the catch or pawl N, while it yields to the upward movement of the cover sufficiently to permit the teeth of the ratchet to pass over the catch or pawl N as the cover is turned.

In the modified form of cup shown in Fig. 4 a piston-rod, A', is substituted for the screw H, and a screw-thread is cut on the periphery of the piston, which operates in a corresponding thread cut in the inner wall of the receptacle. A small bead, *a*, is formed on the side of the piston-rod A', which engages in a corresponding recess in the piston, which causes the piston to rotate with the rod. Thus it is obvious that as the spring recoils the piston and rod rotate together, and are thereby caused to move downward as the thread of the piston traverses the thread of the receptacle. The form of cup shown in Fig. 1 is, however, preferred.

Having thus described my invention, what

I claim as new, and desire to secure by Letters Patent, is—

1. The combination, with the receptacle of a lubricator-cup, of a piston, a screw or piston rod operating said piston, a coiled spring affixed at one end to said screw or piston rod, and at its other end to an inclosing-cover for winding and holding the outer end of said spring when wound, substantially as set forth.

2. The combination of the receptacle A, having a discharge-duct, E, piston F, having a central screw-cut aperture, screw H, cover O, spring G, and cover K, said spring being affixed at one end to said screw H, and at the other end to said cover, as set forth.

3. The combination, with the receptacle A, piston F, screw H, and spring G, of the cover O, provided with catch or pawl N, and the cover K, provided with the annular ratchet M, substantially as and for the purpose specified.

4. The combination, with the cover O, provided with catch N and cover K, provided with ratchet M, engaging upon said pawl, of the spring P and knob R, said spring being interposed between said cover K and said knob, and adapted to hold said ratchet down upon said pawl while it yields to permit said ratchet to be turned over said pawl while winding said spring, as set forth.

In testimony whereof I affix my signature in presence of two witnesses.

FRANK H. BOLTE.

Witnesses:
 JAS. B. ERWIN,
 G. M. GRIDLEY.